US011934277B2

(12) United States Patent
Manville et al.

(10) Patent No.: US 11,934,277 B2
(45) Date of Patent: Mar. 19, 2024

(54) MULTI-CLUSTER DISTRIBUTION

(71) Applicant: Kasten, Inc., Columbus, OH (US)

(72) Inventors: Thomas Manville, Mountain View, CA (US); Vaibhav Kamra, Sunnyvale, CA (US); Deepika Dixit, San Jose, CA (US); Mark Severson, Herriman, UT (US); Onkar Bhat, San Jose, CA (US); Alex Vorbau, Los Altos, CA (US)

(73) Assignee: Kasten, Inc., Columbus, OH (US)

( * ) Notice: Subject to any disclaimer, the term of this patent is extended or adjusted under 35 U.S.C. 154(b) by 3 days.

(21) Appl. No.: 17/500,291

(22) Filed: Oct. 13, 2021

(65) Prior Publication Data

US 2023/0115993 A1 Apr. 13, 2023

(51) Int. Cl.
*G06F 11/14* (2006.01)
*G06F 16/23* (2019.01)

(52) U.S. Cl.
CPC .......... *G06F 11/1458* (2013.01); *G06F 16/23* (2019.01)

(58) Field of Classification Search
CPC .............................. G06F 11/1458; G06F 16/23
USPC ........................................................ 707/654
See application file for complete search history.

(56) References Cited

U.S. PATENT DOCUMENTS

| | | | | |
|---|---|---|---|---|
| 6,751,659 | B1 * | 6/2004 | Fenger | H04L 67/61 |
| | | | | 709/224 |
| 10,402,241 | B1 * | 9/2019 | Loukissas | G06F 16/14 |
| 2005/0027862 | A1 * | 2/2005 | Nguyen | H04L 63/062 |
| | | | | 709/225 |
| 2007/0199044 | A1 * | 8/2007 | Hughes | H04L 63/20 |
| | | | | 726/1 |
| 2013/0262385 | A1 * | 10/2013 | Kumarasamy | G06F 16/275 |
| | | | | 707/634 |
| 2013/0263289 | A1 * | 10/2013 | Vijayan | G06F 21/604 |
| | | | | 726/31 |
| 2016/0337426 | A1 * | 11/2016 | Shribman | H04L 65/612 |
| 2018/0013791 | A1 * | 1/2018 | Healey | H04L 63/0218 |
| 2020/0012572 | A1 * | 1/2020 | Chopra | G06F 21/60 |
| 2020/0314782 | A1 * | 10/2020 | Ruffini | H04W 56/0015 |
| 2021/0216213 | A1 * | 7/2021 | Shveidel | H04L 67/1001 |
| 2022/0317984 | A1 * | 10/2022 | Jessup | G06F 8/437 |

OTHER PUBLICATIONS

International Search Report and Written Opinion of the International Searching Authority directed to related International Patent Application No. PCT/US2021/054787, dated Jun. 13, 2022; 11 pages.

* cited by examiner

*Primary Examiner* — Hicham Skhoun
(74) *Attorney, Agent, or Firm* — Sterne, Kessler, Goldstein & Fox P.L.L.C.

(57) ABSTRACT

Disclosed herein are system, method, and computer program product embodiments for multi-cluster distribution. In some embodiments, a server on a primary computing cluster receives an update to an object stored on the primary computing cluster and to be implemented by a secondary computing cluster. Furthermore, the server receives a request to distribute the object to the secondary computing cluster. The server further retrieves the object based on an object identifier or an identifier of the secondary computing cluster. Moreover, the server identifies the secondary computing cluster based on the object identifier or the identifier of the secondary computing cluster. The server then distributes the object to the secondary computing cluster via a persistent connection.

20 Claims, 7 Drawing Sheets

MULTI-CLUSTER DISTRIBUTION

BACKGROUND

Entities have increasingly started adopting cloud-native architectures and platforms to support their critical applications. These cloud-native architectures and platforms may be implemented across multiple computing clusters, such as multi-cluster and multi-tenant environments. Each computing cluster may execute one or more applications and store data corresponding to the one or more applications.

Each of the computing clusters may be independent of one another and may implement different policies and configurations with respect to back-ups and security. The computing clusters may implement the policies and configurations using a Helm chart (e.g., an application) or a spec written in YAML Ain't Markup Language (YAML). Therefore, each time there is an update in a policy or configuration for a given computing cluster, a new Helm chart or new spec may need to be generated for the given computing cluster. This can become untenable when dealing with a substantial number of computing clusters.

In light of the above, cluster management systems often fail to effectively and efficiently distribute objects including policies, configurations, or other data in a multi-cluster environment.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
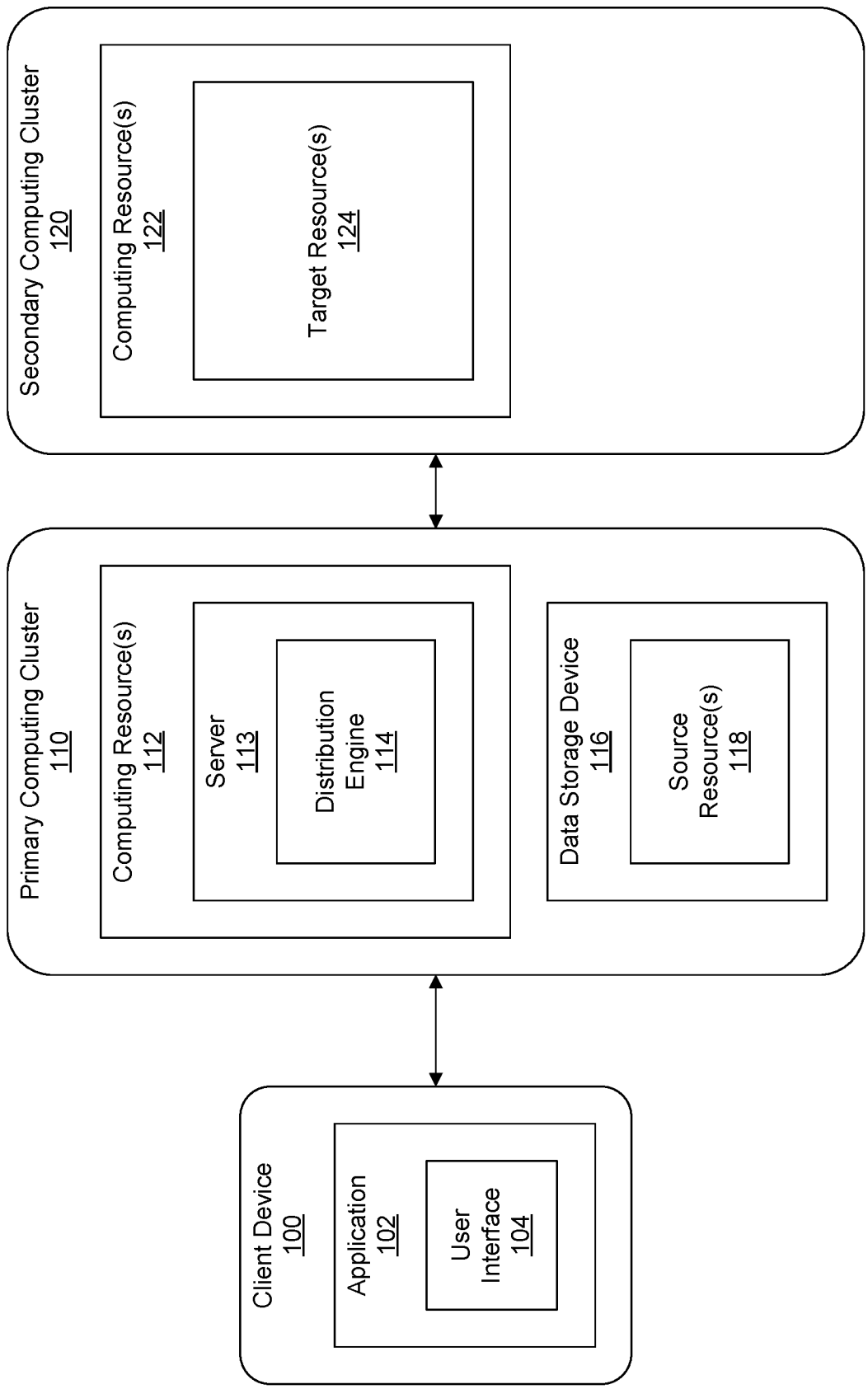
FIG. 1 is a block diagram of an architecture for multi-cluster distribution, according to some embodiments.

Provided herein are system, apparatus, device, method and/or computer program product embodiments, and/or combinations and sub-combinations thereof, for multi-cluster distribution, including distributing objects to computing clusters that represent the policies or configurations of the respective computing cluster.

In a multi-cluster environment, each computing cluster may implement different policies or configurations. The policies or configurations may be associated with security or backups. Furthermore, the policies and configurations may be referred to as resources. Characteristics about the policies and configurations may by updated over time. The characteristics may include a schedule of the backup/restore or a location of the backup. Furthermore, there may be a change to the underlying application which is covered by the policies and configurations. This may trigger an update to the policies and configurations.

However, this often requires creating new resource objects for a computing cluster each time there is an update to the resources for the computing cluster. Moreover, this can require an admin user to access each computing cluster when attempting to update the policies or configurations. This can be an inefficient and error-prone process. Furthermore, it is often not possible to monitor and manage the changes or updates to the resources for the computing clusters at a centralized system. This can result in unaddressed errors and discrepancies.

Embodiments herein solve these technological problems by centrally managing resource distribution between computing clusters. Specifically, a primary computing cluster may distribute resources corresponding to a secondary computing cluster to the secondary computing cluster whenever there is an update to the resources.

In some embodiments, a server on a primary computing cluster receives an update to an object stored on the primary computing cluster that is to be implemented by a secondary computing cluster. Furthermore, the server receives a request to distribute the object to the secondary computing cluster. The request comprises an object identifier or an identifier of the secondary computing cluster. The primary computing cluster may be connected to the secondary computing cluster via a persistent connection. The server retrieves the object based on the object identifier or the identifier of the secondary computing cluster. Moreover, the server identifies the secondary computing cluster based on the object identifier or the identifier of the secondary computing cluster. The server then distributes the object to the secondary computing cluster via the persistent connection.

The described embodiments provide for a centralized system to distribute objects to computing clusters. This allows for updating the policies or configurations of various computing clusters without accessing each computing cluster. Moreover, embodiments herein eliminate discrepancies in the policy and configurations of the computing clusters by automatically and securely distributing the objects to the computing clusters. To this end, embodiments herein solve the above technical issues and challenges by distributing policies and configurations to computing clusters and maintaining different backup policies and configurations for different sets of clusters in a centralized system. This can allow entities to easily maintain proper compliance across all computing clusters.

FIG. 1 is a block diagram of an architecture for multi-cluster distribution, according to some embodiments. The architecture may include a client device 100, primary computing cluster 110, and secondary computing cluster(s) 120. Client device 100, primary computing cluster 110 and secondary computing cluster 120 may be connected through wired connections, wireless connections, or a combination of wired and wireless connections.

As an example, client device 100, primary computing cluster 110, and secondary computing cluster 120 can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Client device 100 may include application 102 and user interface 104. Application 102 may generate user interface 104. Application 102 may communicate with primary computing cluster 110. A user may interact with user interface 104 to interface with primary computing cluster 110.

Primary computing cluster 110 and secondary computing cluster 120 may reside in a cloud computing environment and can be managed by a cloud orchestration system. As a non-limiting example, the cloud orchestration system may be KUBERNETES (developed by Cloud Native Computing Foundation). Primary computing cluster 110 may include computing resources 112. Computing resources 112 may include one or more servers, routers, computing devices, data volumes, workstations, etc. Furthermore, computing resources 112 may include server 113.

Secondary computing cluster 120 may include computing resources 122. Computing resources 122 may include one or more servers, routers, computing devices, data volumes, workstations, etc. Secondary computing cluster 120 may include one or more namespaces. Namespaces are sub-clusters within secondary computing cluster 120. One or more applications may be executed in each namespace.

Users may interact with secondary computing cluster 120 to deploy applications, initiate backups and restores, debug applications, develop applications, etc. For example, secondary cluster 120 may be dedicated to performing one or more tasks such as developing and testing applications. In this regard, secondary computing cluster 120 may allow users to develop and test applications. A different secondary computing cluster 120 may be responsible for the production of an application. That is, the application may be deployed on the different secondary computing cluster. The different secondary computing cluster 120 may allow users to view metrics related to the deployment of the application and debug the deployed application.

Primary computing cluster 110 may be persistently connected (e.g., boot-strapped) to secondary computing cluster 120. As a result, client device 100 may communicate with secondary computing cluster 120 by interfacing with primary computing cluster 110 via application 102. Application 102 may be a web-based application downloaded on client device 100. Alternatively, application 102 may be accessed via an internet browser.

Furthermore, computing resources 112 may include server 113 and a data storage device 116. Server 113 may include distribution engine 114. Data storage device 116 may store source resources 118. A source resource 118 may be an object (e.g., data object) configured to store data. The data may be policies or configurations associated with secondary computing cluster 120. The policies or configurations may be associated with back-ups, security, user profiles, etc. As a non-limiting example, the policies may be policies for executing back-ups (e.g., time, type of back-up, amount of data to be backed up, encryption type, etc.). The configurations may be parameters that define how to store data when executing a back-up. As such, the configurations may be parameters for implementing the policies.

As a non-limiting example, a sources resource 118 may be a Kubernetes K10 object. Source resources 118 may also be templates or specs that define Kubernetes K10 objects. Moreover, source resources 118 may include global location profiles. Location profiles may be used to create backups from snapshots, move applications and their data across clusters and potentially across different clouds, and subsequently import these backups or exports into another cluster. Source resources 118 may also include global policies. Global policies may include policies to be implemented by various secondary computing clusters 120.

Source resources 118 may be created for secondary computing clusters 120 so that they do not affect any configurations or policies in primary computing cluster 110. This avoids accidental effects on primary computing cluster 110. For example, a particular backup policy may not be applicable on primary computing cluster 110; therefore, the corresponding source resource 118 for the backup policy may be stored in a namespace of primary computing cluster 110 such that other components of primary computing cluster 110 do not interact with source resource 118. As such, data storage device 116 may reside in the namespace of primary computing cluster 110 such that source resource 118 may be stored in data storage device 116 without interacting with other components of primary computing cluster 110.

Distribution engine 114 may be configured to distribute source resources 118 to secondary computing cluster 120. Furthermore, distribution engine 114 may monitor any updates to source resources 118. As a non-limiting example, distribution engine 114 may be a Kubernetes K10 component.

Computing resources 122 may include target resources 124. A target resource 124 may be an object (e.g., data object) configured to store data. For example, target resources 124 may store policies or configurations associated with secondary computing cluster 120 received in source resources 118. Target resources 124 may include policies and configurations implemented by secondary computing cluster 120. Distribution engine 114 may monitor target resources 124 to confirm that target resources 124 are current based on source resources 118.

Figure 2:
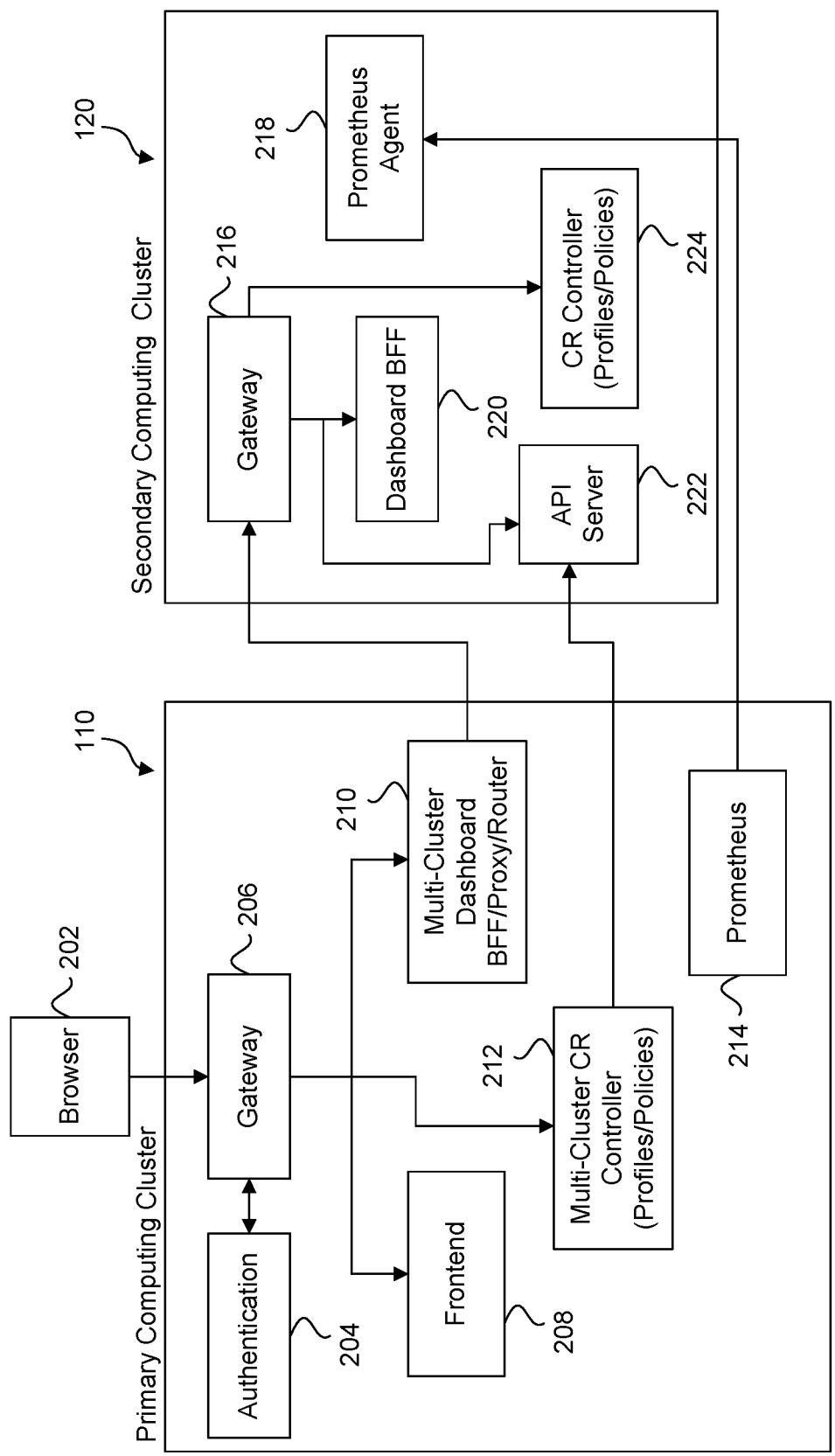
FIG. 2 is a block diagram illustrating components of the primary and secondary computing cluster, according to some embodiments.

FIG. 2 is a block diagram illustrating components of primary computing cluster 110 and secondary computing cluster 120, according to some embodiments. FIG. 2 is described with reference to FIG. 1. However, FIG. 2 is not limited to that example embodiment.

In some embodiments, primary computing cluster 110 may include authentication engine 204, gateway 206, frontend 208, Backend For Frontend (BFF)/Proxy Router 210, controller 212, and instrumentation framework 214. Authentication engine 204, gateway 206, frontend 208, BFF/Proxy Router 210, controller 212, and instrumentation framework 214 may be executed by computer resources 112 (e.g., server 113). Secondary computing cluster 120 may include gateway 216, instrumentation framework agent 218, dashboard BFF 220, Application Program Interface (API) 222, and controller 224. Gateway 216, instrumentation framework (IF) agent 218, dashboard BFF 220, API 222, and controller 224 may be executed by computer resources 122.

Authentication engine 204 may be configured to authenticate a user attempting to access primary computing cluster 110. For example, authentication engine 204 may use a user's username and password to authenticate the user. Gateway 206 may be configured to route traffic received by primary computing cluster 110 to components within primary computing cluster 110. For example, gateway 206 may route traffic to frontend 208, BFF/Proxy Router 210, and controller 212.

Frontend 208 may be a micro-service configured to provide a user interface for a user accessing primary computing cluster 110. BFF/Proxy Router 210 may be a proxy, BFF, or router. BFF/Proxy Router 210 may be configured to route or forward requests to secondary computing cluster 120. To this end, BFF/Proxy/Router 210 may act as a proxy, shim, or router between primary computing cluster 110 and secondary computing cluster 120. Controller 212 may be a control loop of primary computing cluster 110 that monitors the state of primary computing cluster 110. Controller 212 may store the user profiles and policies. The user profiles and policies may be resources of primary computing cluster 110 and secondary computing cluster 120, which a given user may access.

Instrumentation framework 214 may be configured to collect usage data from secondary computing cluster 120. Instrumentation framework 214 may use the usage data of secondary computing cluster 120 and generate data analytics of the usage of secondary computing cluster 120.

Gateway 216 may be configured to route traffic received by secondary computing cluster 120 to components within secondary computing cluster 120. Gateway 216 may route traffic to dashboard BFF 220, API server 222, and controller 224.

Dashboard BFF 220 may be a Backend for Frontend (BFF) shim that is configured to receive requests from gateway 216. A BFF shim may be a layer between the user interface and computing resources (e.g., applications, storage devices, controller etc.). A BFF shim may receive and process requests from mobile devices (e.g., a smartphone) and non-mobile devices (e.g., a desktop computer). Dashboard BFF 220 may be configured to format the received requests and forward the request to the appropriate computer resource of secondary computing cluster 120. API server 222 may be configured to receive requests from gateway 216. API server 222 may format the received requests and forward the request to the appropriate computer resource of secondary computing cluster 120. Controller 224 may be a control loop of secondary computing cluster 120 that monitors the state of secondary computing cluster 120. Controller 224 may manage the user profiles and policies.

Instrumentation framework agent 218 may interface with instrumentation framework 214 to provide usage data for secondary computing cluster 120. For example, instrumentation framework agent 218 may collect usage data of virtual machines, servers, databases residing on secondary computing cluster 120. Instrumentation framework 214 may use the usage data to analyze the performance of secondary computing cluster 120.

In some embodiments, an administrator (or admin) user may access primary computing cluster 110 to establish a persistent connection with secondary computing cluster 120 using browser 202. An admin user may be a system administrator that has access to one or more of the computing clusters (e.g., primary computing cluster 110 and secondary computing cluster 12) in the multi-cluster environment. The admin user's credentials may correspond with an admin user's credentials.

The admin user may use client device 100 to transmit a request to access primary computing cluster 110 from browser 202. Browser 202 may be an internet browser executing on client device 100. It can be appreciated that the admin user may also access primary computing cluster 110 using application 102. Gateway 206 may receive the request to access primary computing cluster 110 from browser 202. The request may include the admin user's credentials. Gateway 206 may forward the admin user's credentials to authentication engine 204. Authentication engine 204 may use the admin user's credentials to authenticate the admin user and transmit a response back to gateway 206. The response may be a verification or failure of authentication of the admin user.

In response to successfully authenticating the admin user, gateway 206 may transmit a request to frontend 208. Frontend 208 may generate a user interface (e.g., user interface 104) to be rendered on browser 202. The user interface may allow for initiating a temporary connection. For example, gateway 206 may transmit a request to controller 212 to establish a temporary connection between primary computing cluster 110 and secondary computing cluster 120 using the admin user's credentials. Controller 212 may transmit the request to API server 222. The request may include the admin user's credentials. API server 222 may format the request and forward the formatted request to an appropriate computing resource on secondary computing cluster 120. The appropriate computing resource may verify the admin user's credentials and establish a temporary connection between primary computing cluster 110 and secondary computing cluster 120. The user interface may render a status or progress while the temporary connection is established and the configuration process is executed. As a non-limiting example, a temporary connection may be a connection in which the primary computing cluster 110 may only access secondary computing cluster 120 using an admin user's credentials.

In response to establishing the temporary connection, gateway 206 may transmit a request to frontend 208. Frontend 208 may generate a user interface (e.g., user interface 104) to be rendered on browser 202. The user interface may allow the admin user to interface with secondary computing cluster 120. For example, the user interface may allow the admin user to transmit requests to secondary computing cluster 120.

The user interface may receive one or more inputs corresponding to a request to establish a persistent connection with secondary computing cluster 120. The one or more inputs may include configuration settings for establishing the persistent connection. The one or more inputs may also include an identifier of the secondary computing cluster. Establishing the persistent connection may involve generating credentials for primary computing cluster 110.

The admin user may submit the request to establish a persistent connection between primary computing cluster 110 and secondary computing cluster 120 using the user interface. Gateway 206 may receive the request and may forward the request to controller 212.

Controller 212 may format the request into specific commands for generating credentials for primary computing cluster 110. The commands may include security certificates, Internet Protocol (IP) addresses of computing resources in the secondary computing cluster 120, and the configuration settings for generating credentials for primary computing cluster 110. The commands may also include the admin user's credentials. As a non-limiting example, the commands may include the following information:

primary-name: User-defined name for primary, may be unique.

primary-kubeconfig: Path to a config file to use for primary computing cluster 110. The config file may contain the configuration settings for generating the credentials for primary computing cluster 110.

primary-context: Name of context in the config file for primary computing cluster 110. A context may be access parameters for primary computing cluster 110.

primary-k10-releaseName: Name of the cloud orchestration system release installed in primary computing cluster 119. This may be a version of the cloud orchestration system.

primary-k10-namespace: Name of the namespaces in primary computing cluster 110.

secondary-name: User-defined name for secondary computing cluster 120. This may be an identifier of secondary computing cluster 120. This may be a unique identifier.

secondary-kubeconfig: Path to the config file to use for secondary computing cluster 120. This may include configuration settings of secondary computing cluster 120.

secondary-context: Name of context in the config file for secondary computing cluster 120. A context may be access parameters for secondary computing cluster 120.

secondary-k10-releaseName: Name of the cloud orchestration system release installed in secondary cluster. This can be the version of the cloud orchestration system executing on secondary computing cluster 120.

secondary-k10-namespace: Name of the namespaces in secondary computing cluster 120.

secondary-ingress: External ingress for secondary computing cluster 120. The external ingress may be an API object that manages external access to the services in a cluster, such as Hypertext Transfer Protocol (HTTP).

Controller 212 may transmit the commands to API server 222 using the temporary connection established between primary computing cluster 110 and secondary computing cluster 120. In some embodiments, the admin user may transmit the formatted commands to generate credentials using a command-line interface (CLI) to primary computing cluster 110. Controller 212 may transmit the commands to API server 222.

API server 222 may format the commands and forward the commands to the appropriate computing resource in second computing cluster 120 to generate the credentials for primary computing cluster 110. The appropriate computing resource may include a service account controller, service account admission controller, and token controller. The appropriate computing resource may package the security certificates, IP addresses of computing resources in the secondary computing cluster 120, and the configuration settings to generate credentials for primary computing cluster 110 to access secondary computing cluster 120. The appropriate computing resource may transmit the credentials to primary computing cluster 110. Controller 212 may store the credentials of primary computing cluster 110 for accessing secondary computing cluster 110. The credentials may include a multi-cluster service account (MCSA) token. The MCSA token may be used to access secondary computing cluster 120. Once controller 212 stores the credentials of primary computing cluster 110, a persistent connection between primary computing cluster 110 and secondary computing cluster 120 may be established.

Once a persistent connection between primary computing cluster 110 and secondary computing cluster 120 is established, a non-admin user may attempt to access secondary computing cluster 120 via primary computing cluster 110. For example, a non-admin user may submit a request to access primary computing cluster 110 via browser 202. The request may include the non-admin user's credentials to access primary computing cluster 110.

As a non-limiting example, a persistent connection may be a connection that allows primary computing cluster 110 to access secondary computing cluster 120 using credentials that are dedicated to primary computing cluster 110. To this end, primary computing cluster 110 may not have to wait for an admin user to provide their credentials to access secondary computing cluster 120. A non-admin user with access to primary computing cluster 110 may access secondary computing cluster 120 by having primary computing cluster 110 access secondary computing cluster 120 using its dedicated credentials.

Gateway 206 may receive the request and may forward the non-admin user's credentials to authentication engine 204. Authentication engine 204 may authenticate the non-admin user using the non-admin user's credentials and transmit a response to gateway 206. The response may include verification or failure of authenticating the non-admin user.

In response to authenticating the non-admin user, gateway 206 may forward the request to BFF/Proxy Router 210. BFF/Proxy Router 210 may verify the non-admin user's permission settings for accessing second computing cluster 120.

In response to verifying the non-admin user's permission settings with respect to secondary computing cluster 120, BFF/Proxy Router 210 may transmit a request to frontend 208. Frontend 208 may generate a user interface (e.g., user interface 104) to be rendered on browser 202. The user interface may include inputs, selections, and other options for interfacing with secondary computing cluster 120. The inputs, selections, and other options may be limited based on the non-admin user's permission settings. The non-admin user may provide their inputs on the user interface and submit a request to be transmitted to secondary computing cluster 120.

Gateway 206 may receive the request from the user interface. Gateway 206 forward the request to BFF/Proxy Router 210. BFF/Proxy Router 210 may retrieve primary computing cluster 110's credentials for accessing secondary computing cluster 120, including, but not limited to, the MCSA token from controller 212. BFF/Proxy/Router 210 may format the request and primary computing cluster 110's credentials. BFF/Proxy/Router 210 may access secondary computing cluster 120 using primary computing cluster 110's credentials while impersonating the non-admin user. In response to accessing secondary computing cluster 120, BFF/Proxy/Router 210 may transmit the request to gateway 216. Accessing secondary computing cluster 120 and impersonating users will be described in greater detail with respect to FIGS. 4, 5, and 8.

Gateway 216 may receive the request from BFF/Proxy/Router 210. Gateway 216 may confirm that the non-admin user has permission to transmit the request using controller 224. Controller 224 may verify that the non-admin user has permission to transmit the request based on cluster role bindings associated with the non-admin user. In response to verifying that the non-admin user has permission to transmit the request, gateway 216 may forward the request to dashboard BFF 220 or API server 222. Dashboard BFF 220 or API server 222 may format the request and forward the request to a computing resource responsible for processing the request.

In this way, the non-admin user can interface with second computing cluster 120 without using specific credentials corresponding to second computing cluster 120. As a result, the non-admin user may interface with secondary computing cluster 120 and other computing clusters to which primary computing cluster 110 is boot-strapped.

Figure 3:
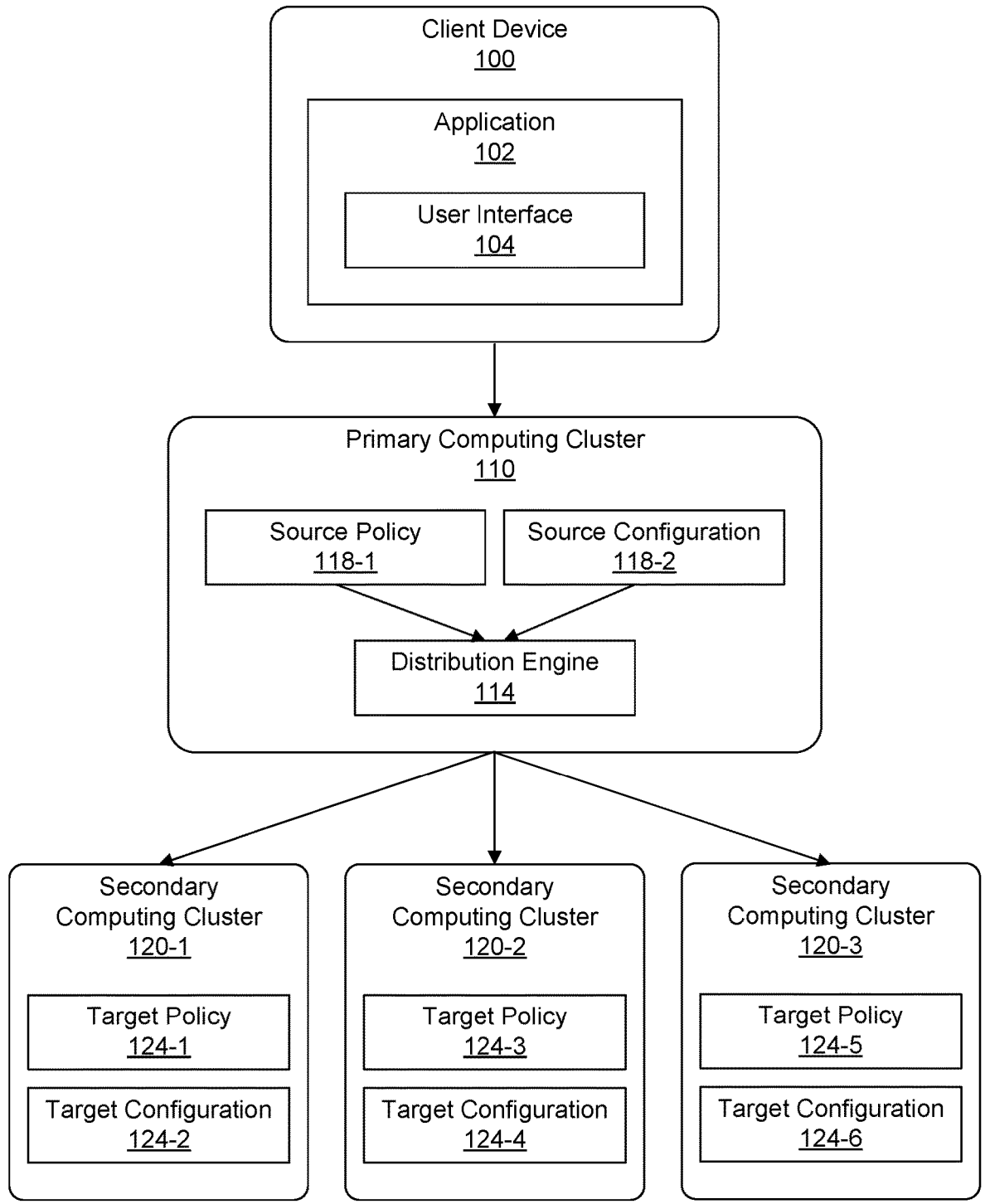
FIG. 3 is a block diagram of a configuration of the architecture for multi-cluster distribution, according to some embodiments.

FIG. 3 is a block diagram of a configuration of the architecture for multi-cluster distribution, according to some embodiments. FIG. 3 is described with reference to FIG. 1. However, FIG. 3 is not limited to that example embodiment.

In some embodiments, primary cluster 110 may be bootstrapped to secondary computing clusters 120-1, 120-2, and 120-3 using the process described with respect to FIG. 2. Primary computing cluster 110 may include source policy 118-1 and source configuration 118-2. Source policy 118-1 and source configuration 118-2 may be part of source resources 118. Source policy 118-1 may be data objects configured to store policies associated with secondary computing clusters 120-1-120-3. Source configuration 118-2 may be data objects configured to store configurations associated with secondary computing clusters 120-1-120-3. As a non-limiting example, source policy 118-1 and source configurations 118-2 may be K10 objects.

Secondary computing cluster 120-1 may include target policy 124-1 and target configuration 124-2. Target policy 124-1 and target configuration 124-2 may be target resources 124 for secondary computing cluster 120-1. Target policy 124-1 may be a data object configured to store policies implemented by secondary computing cluster 120-1. Target configuration 124-2 may be a data object configured to store configurations implemented by secondary computing cluster 120-1. As a non-limiting example, target policy 124-1 and target configuration 124-2 may be K10 objects.

Secondary computing cluster 120-2 may include target policy 124-3 and target configuration 124-4. Target policy 124-3 and target configuration 124-4 may be target resources 124 for secondary computing cluster 120-2. Target policy 124-3 may be a data object configured to store policies implemented by secondary computing cluster 120-2. Target configuration 124-4 may be a data object configured to store configurations implemented by secondary computing cluster 120-2. As a non-limiting example, target policy 124-3 and target configuration 124-4 may be K10 objects.

Secondary computing cluster 120-3 may include target policy 124-5 and target configuration 124-6. Target policy 124-5 and target configuration 124-6 may be target resources 124 for secondary computing cluster 120-3. Target policy 124-5 may be a data object configured to store policies implemented by secondary computing cluster 120-3. Target configuration 124-6 may be a data object configured to store configurations implemented by secondary computing cluster 120-3. As a non-limiting example, target policy 124-5 and target configuration 124-6 may be K10 objects.

Client device 100 may launch application 102 based on user input with client device 100. Application 102 may render user interface 104. User interface 104 may allow users to upload updated source resources 118 for secondary computing clusters 120-1, 120-2, or 120-3. User interface 104 may allow the user to transmit requests to distribute source resources 118 to secondary computing clusters 120-1, 120-2, or 120-3. The request may include the uploaded source resources 118 are to be distributed to secondary computing cluster 120-1, 120-2, or 120-3. Alternatively, the request may indicate source resources 118 loaded in primary computing cluster 110.

For example, application 102 may receive user input on user interface 104 to transmit source resources 118 to secondary computing cluster 120-1. Application 102 may transmit the request to transmit source resources 118 to secondary computing cluster 120-1. The request may include source resources 118 to be distributed to secondary computing cluster 120-1. Alternatively, the request may indicate (or include an identifier) of source resources 118 to be distributed to secondary computing cluster 120-1.

Primary computing cluster 110 may receive the request. Distribution engine 114 may identify source policy 118-1 and/or source configuration 118-2 to be distributed to secondary computing cluster 120-1 based on the request. For example, distribution engine 114 may store a mapping of source policy 118-1 and/or source configuration 118-2 and the corresponding secondary computing cluster 120. Distribution engine 114 may identify the source policy 118-1 and/or source configuration 118-2 that corresponds with secondary computing cluster 120-1 based on an identifier of source policy 118-1 and/or source configuration 118-2 in the request. In some embodiments, distribution engine 114 may identify the source policy 118-1 and/or source configuration 118-2 corresponding with secondary computing cluster 120-1 based on an identifier of secondary computing cluster 120-1 in the request.

Distribution engine 114 may retrieve the identified source policy 118-1 and/or source configuration 118-2 corresponding to secondary computing cluster 120-1 and transform the source policy 118-1 and/or source configuration 118-2 such that it may be implemented by secondary computing cluster 120-1. For example, distribution engine 114 may transform the data in source policy 118-1 and/or source configuration 118-2 such that it is compatible with secondary computing cluster 120-1. Distribution engine 114 may also transform the name of source policy 118-1 and/or source configuration 118-2 to match secondary computing cluster 120-1. In this way, any computing resource of secondary computing cluster 120-1 that calls on source policy 118-1 and/or source configuration 118-2 uses the accurate name.

Distribution engine 114 may distribute the transformed source policy 118-1 and/or source configuration 118-2 to secondary computing cluster 120-1 via the persistent connection between primary computing cluster 110 and secondary computing cluster 120-1. Distribution engine 114 may distribute the transformed source policy 118-1 and/or source configuration 118-2 as a single data object or multiple data objects.

Secondary computing cluster 120-1 may receive source policy 118-1 and/or source configuration 118-2 from primary computing cluster 110. Secondary computing cluster 120-1 may implement source policy 118-1 and/or source configuration 118-2 as target policy 124-1 and target configuration 124-2, respectively.

The request may include a date and time to implement source policy 118-1 and/or source configuration 118-2. As such, distribution engine 114 may distribute source policy 118-1 and/or source configuration 118-2 to secondary computing cluster 120-1 at the date and time included in the request. Alternatively, distribution engine 114 may instruct secondary computing cluster 120-1 to implement source policy 118-1 and/or source configuration 118-2 at the date and time included in the request.

Distribution engine 114 may receive updates to source policy 118-1 and/or source configuration 118-2 for one or more of secondary computing clusters 120-1-120-3. Characteristics about the source policy 118-1 and/or source configuration 118-2 may by updated over time. For example, source policy 118-1 and/or source configuration 118-2 may be backup policies and configurations of the backup policies. The characteristics may include a schedule of a backup/restore or a location of the backup. Furthermore, there may be a change to the underlying application which is covered by the policies and configurations. This may trigger an update to source policy 118-1 and/or source configuration 118-2.

Distribution engine 114 may monitor or track the differences between source policy 118-1 and/or source configuration 118-2 for secondary computing clusters 120-1-120-3 stored in primary computing cluster 110 and target resources 124 implemented by secondary computing clusters 120-1-120-3. In response to detecting a difference, distribution engine 114 may distribute the appropriate source policy 118-1 and/or source configuration 118-2 to the respective secondary computing cluster 120. For example, distribution engine 114 may monitor source resource 118 generation, source resource 118 version, and source resource 118 identifier against the version observed when source resource 118 was last distributed or the version of target resource 124. If a change is detected, the source resource 118 is automatically redistributed to a respective secondary computing cluster 120-1-120-3.

Distribution engine 114 may also track target resources 124 to identify problems (e.g., errors, exceptions, etc.) with the respective target resource 124. If distribution engine 114 detects a problem with a respective target resource 124, distribution engine 114 redistributes a corresponding source resource 118 to a respective secondary computing cluster 120.

In some embodiments, distribution engine 114 may need to send multiple objects representing source resources 118 to secondary computing cluster 120. The objects may include dependencies to data in other objects. As such, distribution engine 114 may identify the dependencies between the objects. Distribution engine 114 identifies an order in which to distribute the objects to secondary computing cluster 120 such that the dependencies between the objects are maintained. Distribution engine 114 may distribute the objects in the identified order to secondary computing cluster 120. In the event distribution engine 114 determines that an object contains secrets (e.g., passwords, encryption keys, etc.), the object may be distributed before any other object.

In some embodiments, the request may be to distribute source resource 118 to primary computing cluster 110. Source resource 118 may correspond with policies or configurations associated with primary computing cluster 110. Distribution engine 114 may distribute source resource 118 to primary computing cluster 110 by transmitting source resource 118 to the specified namespace in primary computing cluster 110. The specified namespace may be configured to receive source resource 118 and implement it as target resource 124.

Figure 4:
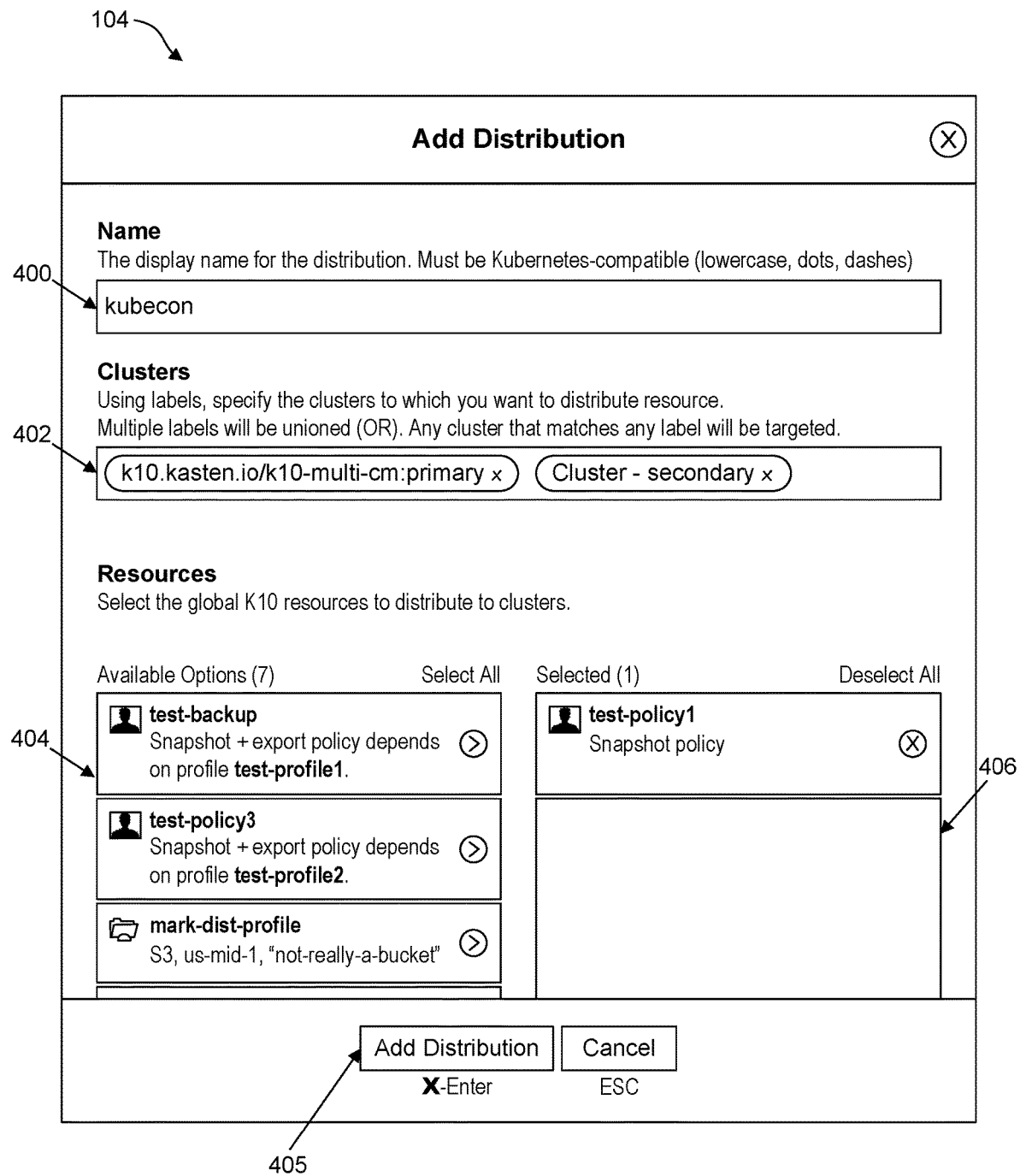
FIG. 4 illustrates an example user interface for the system of multi-cluster distribution.

FIG. 4 illustrates an example user interface 104 for the system of multi-cluster distribution, according to some embodiments. FIG. 4 is described with reference to FIG. 1. However, FIG. 4 is not limited to that example embodiment.

User interface 104 may be rendered on client device 100 in response to launching application 102. User interface 104 may allow a user to transmit requests to distribute source resources 118 to one or more secondary computing clusters 120. User interface 104 may include input field 400 for inputting the distribution identifier. The distribution identifier may be a display name for the distribution.

User interface 104 may also include input field 402 for inputting one or more identifiers of secondary computing clusters 120. This may identify which secondary computing clusters 120 to distribute source resources 118 in the distribution.

User interface 104 may also include resource list 404. Resource list 404 may be a list of source resources 118 available at primary computing cluster 110. Resource list 404 may include identifiers of source resources 118. Furthermore, resource list 404 may include the data objects representing source resources 118. A user may select one or more source resources 118 from resource list 404 to be distributed to secondary computing clusters 120. The selected sources resources 118 may be included in selected list 405. A user may add or remove source resources 118 from selected list 405.

A user may add the distribution by selecting button 406. By adding the distribution application 102 may transmit the request for the distribution to primary computing cluster 110. The request may be a data object including the identifiers for secondary computing clusters 120 to receive source resources 118 and identifiers of source resources 118 to be distributed. The data object of the request may include the data objects of source resources 118 to be distributed.

Figure 5:
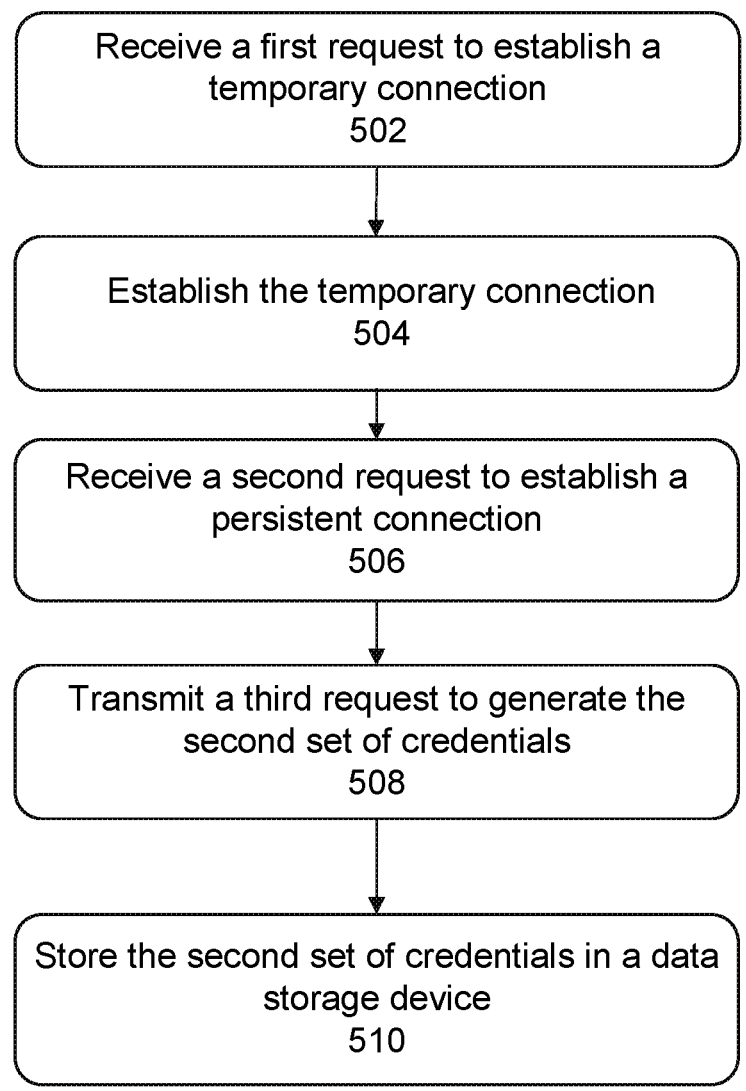
FIG. 5 is a flowchart illustrating a process for establishing a persistent connection between the primary computing cluster and secondary computing cluster, according to some embodiments.

FIG. 5 is a flowchart illustrating a method 500 for establishing a persistent connection between the primary computing cluster and secondary computing cluster, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 5, as will be understood by a person of ordinary skill in the art.

Method 500 shall be described with reference to FIG. 1. However, method 500 is not limited to that example embodiment.

In 502, server 113 receives a first request to establish a temporary connection between primary computing cluster 110 and secondary computing cluster 120 from client device 100. Server 113 may be part of computing resources 112 of primary computing cluster 110. The request may include a first set of credentials corresponding to an admin user. The admin user may have permission to access primary computing cluster 110 and secondary computing cluster 120.

In 504, server 113 establishes the temporary connection between primary computing cluster 110 and secondary computing cluster 120 using the first set of credentials. Server 113 may access secondary computing cluster 120 using the first set of credentials to form the temporary connection. Server 113 may render user interface 104 on client device 100 in response to forming the temporary connection. User interface 104 may provide the admin user to transmit requests to secondary computing cluster 120.

In 506, server 113 receives a second request to establish a persistent connection between primary computing cluster 110 and secondary computing cluster 120 from user interface 104. Establishing the persistent connection may involve generating a second set of credentials for primary computing cluster 110 to access secondary computing cluster 120. In this regard, the second request may include configuration settings for generating the second set of credentials. The request may also include an identifier of secondary computing cluster 120.

In 508, server 113 transmits a third request to generate the second set of credentials to secondary computing cluster 120 using the temporary connection. The request may include the configuration settings, security certificates, and IP addresses of computing resources 122. A computing resource of secondary computing cluster 120 may package the configuration settings, security certificates, and IP addresses to generate the second set of credentials. Secondary computing cluster 120 may transmit the second set of credentials to primary computing cluster 110.

In 510, server 113 stores the second set of credentials in a data storage device. For example, the data storage device may be coupled with controller 212 residing on primary computing cluster 110. The second set of credentials may allow non-admin users to access secondary computing cluster 120 without specific credentials corresponding to secondary computing cluster 120.

Figure 6:
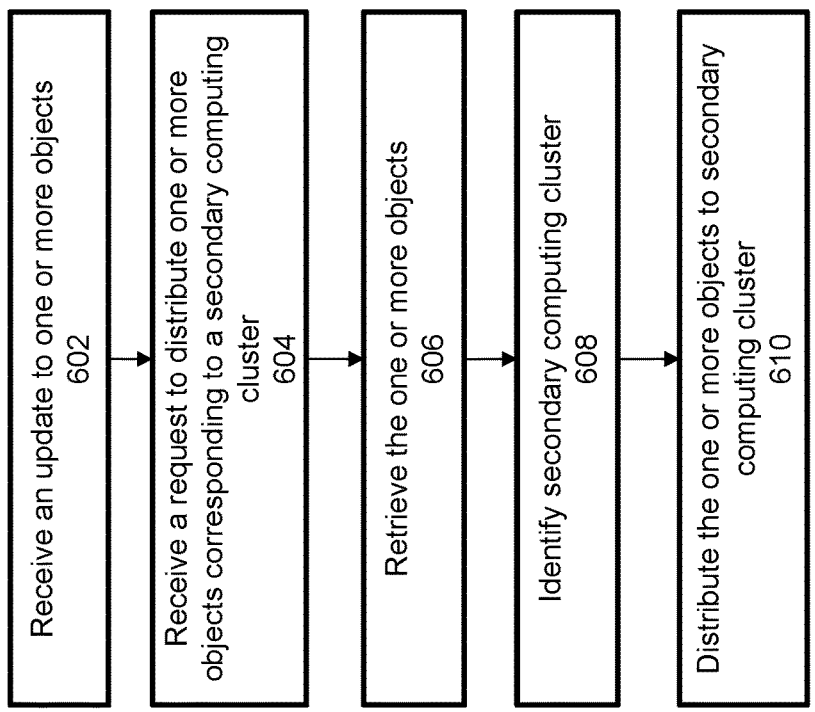
FIG. 6 is a flowchart illustrating a process for distributing source resources to secondary computing clusters, according to some embodiments.

FIG. 6 is a flowchart illustrating a method 600 for distributed source resources to secondary computing clusters, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 6, as will be understood by a person of ordinary skill in the art.

Method 600 shall be described with reference to FIG. 1. However, method 600 is not limited to that example embodiment.

In 602, server 113 or primary computing cluster 110 receives an update to one or more objects stored on primary computing cluster 110 that are to be implemented on secondary computing cluster 120. The one or more objects may be data objects of source resources 118. Characteristics about the source resources 118 may by updated over time. For example, source resources 118 may be backup policies and configurations of the backup policies. The characteristics may include a schedule of a backup/restore or a location of the backup. Furthermore, there may be a change to the underlying application which is covered by the policies and configurations. This may trigger an update to source resources 118.

In 604, server 113 receives a request to distribute one or more objects corresponding to a secondary computing cluster 120. The request may be a data object including an object identifier (e.g., source resource 118's identifier) or an identifier of secondary computing cluster 120. Primary computing cluster 110 is connected to secondary computing cluster 120 via a persistent connection, as described in method 500 of FIG. 5.

In 606, distribution engine 114 retrieves the one or more objects based on the object identifier for each of the respective one or more objects or the identifier of secondary computing cluster 120. Source resources 118 may be stored in data storage device 116. Source resources 118 may be mapped to secondary computer clusters 120 in data storage device 116.

In 608, distribution engine 114 identifies secondary computing cluster 120 based on the object identifier for each of the respective one or more objects or the identifier of secondary computing cluster 120. For example, distribution engine 114 may identify secondary computing cluster 120 based using the identifier of each of the one or more objects and the mapping of source resources 118 with secondary computing cluster 120. Alternatively, distribution engine 114 may identify an address of secondary computing cluster 120 using the identifier of secondary computing cluster 120.

In 610, distribution engine 114 distributes the one or more objects to secondary computing cluster 120 via the persistent connection between primary computing cluster 110 and secondary computing cluster 120. Once distributed, secondary computing cluster 120 may implement source resources 118.

Figure 7:
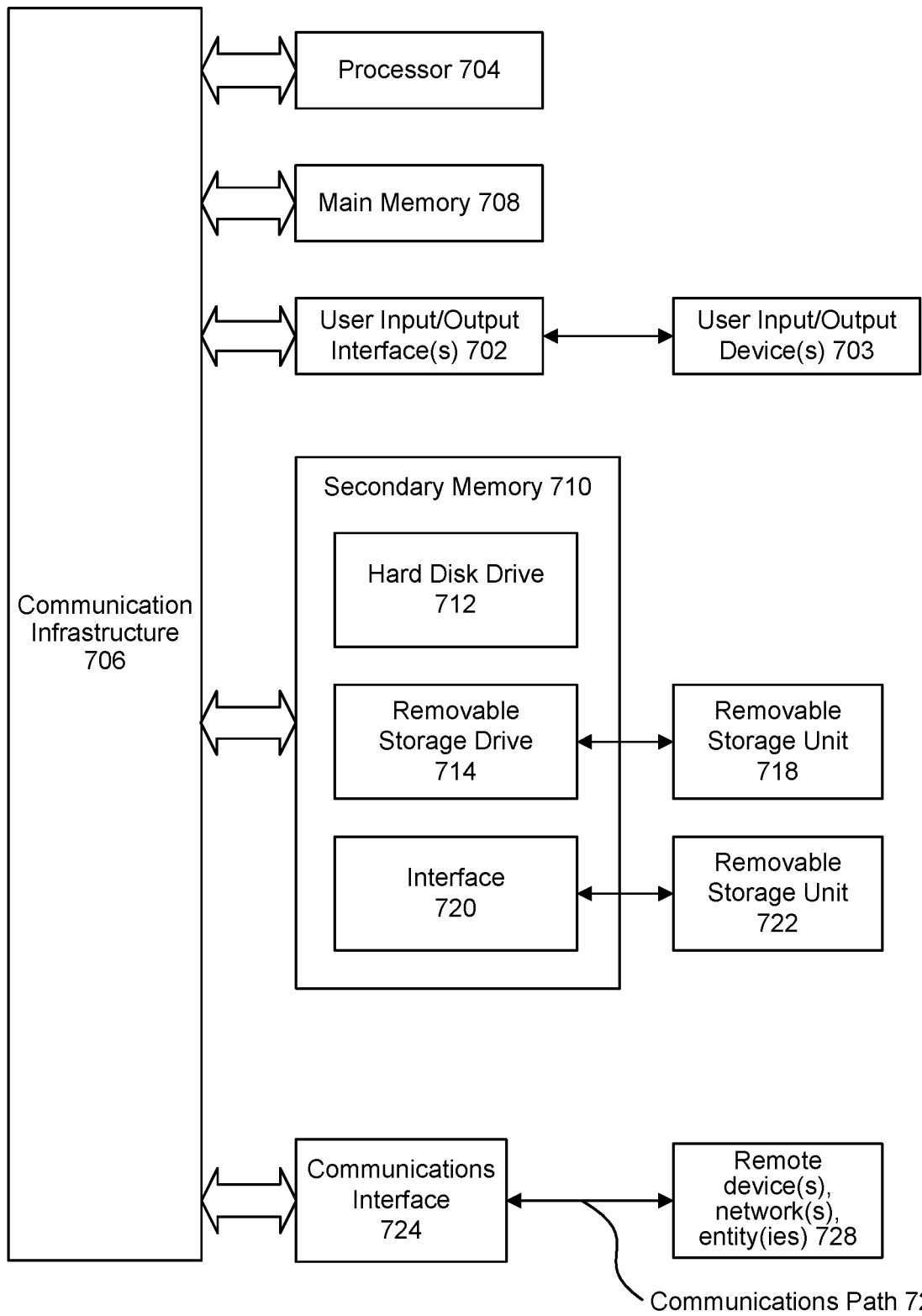
FIG. 7 is an example computer system useful for implementing various embodiments.

Various embodiments can be implemented, for example, using one or more computer systems, such as computer system 700 shown in FIG. 7. Computer system 700 can be used, for example, to implement methods 500 of FIG. 5 and 600 of FIG. 6. Furthermore, computer system 700 can be at least part of client device 100, primary computing cluster 110, and secondary computing cluster 120, as shown in FIG. 1. For example, computer system 700 routes communication to various applications. Computer system 700 can be any computer capable of performing the functions described herein.

Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704, can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 can include one or more levels of cache. Main memory 708 has stored therein control logic (i.e., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 includes a computer usable or readable storage device having stored thereon computer software (control logic) and/or data. Removable storage unit 718 can be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 can include other means, instrumentalities, or other approaches for allowing computer programs and/or other instructions and/or data to be accessed by computer system 700. Such means, instrumentalities, or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 enables computer system 700 to communicate and interact with any combination of remote devices, remote networks, remote entities, etc. (individually and collectively referenced by reference number 728). For example, communication interface 724 can allow computer system 700 to communicate with remote devices 728 over communications path 726, which can be wired and/or wireless, and which can include any combination of LANs, WANs, the Internet, etc. Control logic and/or data can be transmitted to and from computer system 700 via communication path 726.

In some embodiments, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc., using orderings different than those described herein.

References herein to "one embodiment," "an embodiment," "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method implemented on a primary computing cluster for distributing objects across computing clusters, the method comprising:
   receiving an update to a first object stored on the primary computing cluster that is to be implemented by a secondary computing cluster;
   receiving a request to distribute the first object to the secondary computing cluster, wherein the primary computing cluster is connected to the secondary computing cluster via a persistent connection;
   retrieving the first object based on an object identifier for the object or an identifier of the secondary computing cluster;
   identifying the secondary computing cluster based on the object identifier or the identifier of the secondary computing cluster; and
   distributing the first object to the secondary computing cluster via the persistent connection and in an order defined by a security element of a second object stored on the primary computing cluster that is to be implemented by the secondary computing cluster before implementation of the first object.

2. The computer-implemented of claim 1, wherein the first object comprises backup storage policies or configurations associated with the secondary computing cluster, and the backup storage policies or the configurations comprise at least one backup storage policy or configuration that is different than previous backup storage policies or previous configurations implemented by the secondary computing cluster, and wherein the configurations are parameters used to implement the backup storage policies.

3. The computer-implemented of claim 2, wherein the secondary computing cluster implements the backup storage policies or the configurations included in the first object in response to receiving the first object.

4. The computer-implemented of claim 1, further comprising:
   storing a plurality of objects in a data storage device associated with the primary computing cluster, wherein the plurality of objects comprises the first object corresponding to the secondary computing cluster and other objects corresponding to other secondary computing clusters.

5. The computer-implemented of claim 4, wherein the data storage device resides in a namespace of the primary computing cluster such that configuration and backup storage policies of the primary computing cluster remain unaffected by the plurality of objects.

6. The computer-implemented of claim 1, wherein the persistent connection is established based on credentials for a first user type and enables requests from a second user type for an object stored on the secondary computing cluster without credentials for the second user type.

7. The computer-implemented of claim 1, further comprising:
transforming the first object so that the first object is configured to be implemented by the secondary computing cluster, in response to retrieving the first object.

8. The computer-implemented of claim 1, further comprising:
monitoring the first object on the secondary computing cluster to determine whether the first object corresponding to the secondary computing cluster on the primary computing cluster has been updated.

9. A system implemented on a primary computing cluster for distributing objects across clusters, the system comprising:
at least one memory; and
at least one processor coupled to the at least one memory, the at least one processor configured to:
receive an update to a first object stored on the primary computing cluster that is to be implemented by a secondary computing cluster;
receive a request to distribute the first object to the secondary computing cluster, wherein the primary computing cluster is connected to the secondary computing cluster via a persistent connection;
retrieve the first object based on an object identifier for the first object or an identifier of the secondary computing cluster;
identify the secondary computing cluster based on the object identifier or the identifier of the secondary computing cluster; and
distribute the first object to the secondary computing cluster via the persistent connection and in an order defined by a security element of a second object stored on the primary computing cluster that is to be implemented by the secondary computing cluster before implementation of the first object.

10. The system of claim 9, wherein the first object comprises backup storage policies or configurations associated with the secondary computing cluster, and the backup storage policies or the configurations comprise at least one backup storage policy or configuration that is different than previous backup storage policies or previous configurations implemented by the secondary computing cluster, and wherein the configurations are parameters used to implement the backup storage policies.

11. The system of claim 10, wherein the secondary computing cluster implements the backup storage policies or the configurations included in the first object in response to receiving the first object.

12. The system of claim 9, wherein the at least one processor is further configured to:
store a plurality of objects in a data storage device associated with the primary computing cluster, wherein the plurality of objects comprises the first object corresponding to the secondary computing cluster and other objects corresponding to other secondary computing clusters.

13. The system of claim 12, wherein the data storage device resides in a namespace of the primary computing cluster such that configuration and backup storage policies of the primary computing cluster remain unaffected by the plurality of objects.

14. The system of claim 9, wherein the persistent connection is established based on credentials for a first user type and enables requests from a second user type for an object stored on the secondary computing cluster without credentials for the second user type.

15. The system of claim 9, wherein the at least one processor is further configured to:
transform the first object so that the first object is configured to be implemented by the secondary computing cluster, in response to retrieving the object.

16. The system 9, wherein the at least one processor is further configured to:
monitor the first object on the secondary computing cluster to determine whether the first object corresponding to the secondary computing cluster on the primary computing cluster has been updated.

17. A non-transitory computer-readable medium having instructions stored thereon that, when executed by at least one computing device, causes a primary computing cluster to perform operations comprising, the operations comprising:
receiving an update to a first object stored on the primary computing cluster that is to be implemented by a secondary computing cluster;
receiving a request to distribute the first object to the secondary computing cluster, wherein the primary computing cluster is connected to the secondary computing cluster via a persistent connection;
retrieving the first object based on an object identifier for the first object or an identifier of the secondary computing cluster;
identifying the secondary computing cluster based on the object identifier or the identifier of the secondary computing cluster; and
distributing the object to the secondary computing cluster via the persistent connection and in an order defined by a security element of a second object stored on the primary computing cluster that is to be implemented by the secondary computing cluster before implementation of the first object.

18. The non-transitory computer-readable medium of claim 17, wherein the first object comprises backup storage policies or configurations associated with the secondary computing cluster, and the backup storage policies or the configurations comprise at least one backup storage policy or configuration that is different than previous backup storage policies or previous configurations implemented by the secondary computing cluster, and wherein the configurations are parameters used to implement the backup storage policies.

19. The non-transitory computer-readable medium of claim 17, wherein the operations further comprise:
store a plurality of objects in a data storage device associated with the primary computing cluster, wherein the plurality of objects comprises the first object corresponding to the secondary computing cluster and other objects corresponding to other secondary computing clusters, wherein the data storage device resides in a namespace of the primary computing cluster such that configuration and policies of the primary computing cluster remain unaffected by the plurality of objects.

20. The non-transitory computer-readable medium of claim 17, wherein the persistent connection is established based on credentials for a first user type and enables requests from a second user type for an object stored on the secondary computing cluster without credentials for the second user type.

\* \* \* \* \*

UNITED STATES PATENT AND TRADEMARK OFFICE
CERTIFICATE OF CORRECTION

PATENT NO. : 11,934,277 B2
APPLICATION NO. : 17/500291
DATED : March 19, 2024
INVENTOR(S) : Manville et al.

Page 1 of 1

It is certified that error appears in the above-identified patent and that said Letters Patent is hereby corrected as shown below:

In the Claims

In Column 16, Claim 2, Line 42, before "of", insert -- method --.

In Column 16, Claim 3, Line 51, before "of", insert -- method --.

In Column 16, Claim 4, Line 55, before "of", insert -- method --.

In Column 16, Claim 5, Line 63, before "of", insert -- method --.

In Column 17, Claim 6, Line 1, before "of", insert -- method --.

In Column 17, Claim 7, Line 6, before "of", insert -- method --.

In Column 17, Claim 8, Line 11, before "of", insert -- method --.

In Column 18, Claim 16, Line 12, after "system", insert -- of claim --.

Signed and Sealed this
Twenty-first Day of October, 2025

John A. Squires
*Director of the United States Patent and Trademark Office*